United States Patent [19]
Kanno

[11] 3,776,115
[45] Dec. 4, 1973

[54] CAMERA SHUTTER SYSTEM
[75] Inventor: Kyusei Kanno, Tokyo, Japan
[73] Assignee: Asahi Kogaku Kogyo Kabushiki Kaisha, Tokyo-to, Japan
[22] Filed: Dec. 22, 1971
[21] Appl. No.: 210,697

[30] Foreign Application Priority Data
Apr. 17, 1971 Japan.............................. 46/24685

[52] U.S. Cl. ............................................. 95/53 EB
[51] Int. Cl. ............................................. G03b 9/02
[58] Field of Search ..................... 95/10 CT, 53 EA, 95/53 EB

[56] References Cited
UNITED STATES PATENTS
3,635,142  1/1972  Ataka et al. ............................. 95/53

Primary Examiner—Samuel S. Matthews
Assistant Examiner—Michael L. Gellner
Attorney—Stanley Wolder

[57] ABSTRACT

A camera includes a focal plane shutter with an electrical timing network and a lens shutter. The timing network includes an RC timing circuit connected through a first switch to a battery and a second switch shunting the RC capacitor and opened with the opening of the focal plane shutter. The first switch is opened and closed with the charging and discharging of the lens shutter, and a solenoid controlled by a solid state switch whose input is connected across the capacitor controls the shutting of the focal plane shutter.

4 Claims, 2 Drawing Figures

PATENTED DEC 4 1973

3,776,115

INVENTOR
KYUSEI KANNO

BY Stanley Wolder

ATTORNEY

CAMERA SHUTTER SYSTEM

BACKGROUND OF THE INVENTION

The present invention relates generally to improvements in cameras and it relates more particularly to an improved camera including both a focal plane shutter and a built in or interchangeable lens shutter in which the shutters are selectively operable to effect to desired exposure time.

An important advantage of a camera having a focal plane shutter is that the objective can be interchanged in the camera while loaded with film. However, the disadvantages of such a camera are that in synchronized photography with flash illumination, such as with a speed light, the user is compelled to employ such a slow-shutter operation that the film aperture is at least temporarily fully opened, and that when a high-speed shutter opening for photographing a rapidly moving object that a slit-formed shutter aperture passes over the film aperture and the image is deformed, this latter phenomenon being disadvantageous especially in photographing operation in scientific experiments.

A lens shutter arrangement operates in a manner to eliminate the above mentioned disadvantages of a focal plane shutter arrangement. Accordingly, a camera provided with these two shutter arrangements enables the user not only to interchange the objective but also to perform synchronized illumination photographing operations and scientific experiment photographing operations with a rapid shutter speed.

With a camera having such two shutter arrangements, the photographic operation is made in such a manner that one shutter arrangement controls the film exposure time while the other shutter arrangement remains open. Generally, the focal plane shutter arrangement will be used for normal photographing operations and the lens shutter arrangement will be used for only special purposes. For such normal photographing operations interchangeable objectives having no shutter arrangement will be used so that the focal plane shutter arrangement is operated in the same manner as that with a camera having such shutter arrangement.

When a lens shutter arrangement is to be used for a special prupose, either an interchangeable objective having a lens shutter arrangement is used or a lens shutter arrangement provided in the camera is used. In this case, the focal plane shutter arrangement must be opened before the operation of the lens shutter. One method is that when the camera is ready to start photographing operation the focal plane shutter arrangement is set to "bulb" exposure or "time" exposure (such shutter control that if not actuated from outside for closure the shutter remains open) and the lens shutter is actuated while the focal plane shutter remains open. According to this method, after the operation of the lens shutter, if a closure signal is not given to the focal plane shutter it remains open. Now, one of the features of a camera having a focal plane shutter is that interchange of objectives is possible, and with such camera the user is accustomed to interchange objectives. If after use of the lens shutter the user forgets this and removes the objective from the camera for objective interchange, then the film surface will be exposed to light without the protection of the focal plane shutter.

It is possible to set the focal plane shutter to such low-speed exposure that the film aperture is at least temporarily fully opened. However, according to this method, upon using the lens shutter the focal plane shutter must be set to a specific timing control value.

It is thus clear from the above that the arrangements heretofore available and proposed in cameras having both focal plane and lens shutters possess numerous drawbacks and disadvantages and leave much to be desired.

SUMMARY OF THE INVENTION

It is thus a principal object of the present invention to provide an improved camera shutter system.

Another object of the present invention is to provide an improved focal plane and lens shutter system.

Still another object of the present invention is to provide in a camera an improved combination of focal plane shutter having an electric shutter timing network and a lens shutter in which the shutters are so related that the closing of the focal plane shutter is automatically effected by the closing of the lens shutter.

A further object of the present invention is to provide a mechanism of the above nature characterized by its reliability, simplicity, efficiency, and high versatility and adaptability.

The above and other objects of the present invention will become apparent from a reading of the following description taken in conjunction with the accompanying drawing which illustrates a preferred embodiment thereof.

In the arrangement of the present invention an electrically timed focal plane shutter and a lens shutter are so related that the focal plane shutter which is open during the operation of the lens shutter is automatically closed following the closing of the lens shutter. Thus, since the focal plane shutter is automatically closed without the need for any manipulation or operation on the part of the photographer the drawbacks described above which characterize the conventional focal plane and lens shutter combinations are obviated.

Accordingly, in a sense the present invention contemplates the provision in a camera including a focal plane shutter and a lens shutter moveable between charged and discharged positions, of and electrical timing network including means responsive to the charging of the lens shutter for disabling the initiating of the timing network and responsive to the discharging of the lens shutter and the opening of the focal plane shutter for initiating the timing network, and means responsive to the output of the timing networking for closing the focal plane shutter.

In its preferred form, the timing network includes an RC circuit connected through a first switch to a battery, the RC capacitor being shunted by a second switch and connected to the input of a solid state switch whose output controls a focal plane shutter closing solenoid. The first switch is open and closed with the charging and discharging of the lens shutter and the second switch is normally closed and is opened with the opening of the focal plane shutter. The resistance component of the RC circuit may be adjustable and may include a photoconductor.

DESCRIPTION OF THE PREFERRED EMBODIMENT

Figure 1:
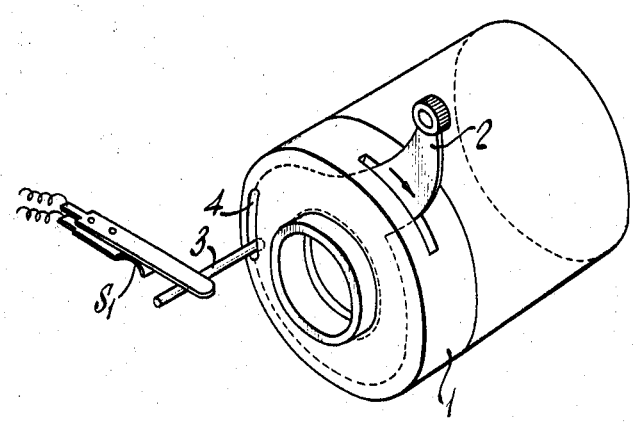
FIG. 1 is a rear perspective view of the lens shutter section and switch control assembly in a camera embodying the present invention.

Referring now to the drawing which illustrates a preferred embodiment of the present invention, the reference numeral 1 generally designates a suitably housed lens shutter of conventional construction which includes a finger actuated shutter set lever 2 which extends from the shutter charging or cocking ring. A pin 3 is mounted on the charging ring and projects rearwardly therefrom through a slot 4 in the rear wall of the lens barrel into the interior of the camera body which includes a focal plane shutter and an electrical timing mechanism. A normally closed Switch $S_1$ is located within the camera body and includes a moveable contact piece or arm which is positioned proximate to and in the path of the outer end portion of the pin 3.

The focal plane shutter timing and shutter relating network comprises an RC timing network which includes a timing capacitor C connected in series through a multipole selector switch $S_4$ with a selected resistor $R_1$, $R_2$,–$R_n$, one of which may be a photosensitive element, such as a photoconductor exposed to the camera incident light, so that the shutter exposure speed may be selectively or automatically controlled. The ends of the resistors $R_1$, $R_2$,–$R_n$, remote from capacitor C are joined and connected through the switch $S_1$ and a normally open switch $S_2$, in series to a first pole of a battery B the second pole of which is connected to the terminal of capacitor C remote from the resistors $R_1$, $R_2$–$R_n$. The switch $S_1$ is maintained in its closed condition when the focal plane shutter is employed for the exposure control and the switch $S_2$ is associated with the focal plane shutter in the known manner so as to be closed before the release of the leading screen or the initiating of the shutter release. The capacitor C is shunted by a normally closed switch $S_3$ which is opened, in the known manner, in synchronism with the opening of the focal plane shutter and is closed with the closing of the focal plane shutter.

The junction point P of capacitor C and switch $S_4$ is connected to the base of a transistor $T_1$ whose emitter is connected to the battery second terminal through a resistor and whose collector is connected to the first battery terminal through a resistor and switch $S_2$ in series and to the base of a transistor $T_2$. The emitter of transistor $T_2$ is connected to the battery second terminal and the collector thereof is connected through a solenoid M and switch $S_2$ in series to the battery first terminal. The solenoid M, by way of the solid state switch including transistors $T_1$ and $T_2$ and under the control of the RC circuit including capacitor C and a selected resistor functions to release the focal plane shutter a time interval following the closing of switches $S_2$ and $S_1$ and the opening of switch $S_3$.

Accordingly, when, in synchronism with the run of the leading screen in the opening action of the focal plane shutter, the switch $S_3$ is opened, and a current flowing through a resistor $R_n$ selected by the switch $S_4$ flows into the timing capacitor C. When, as a result of charging of the capacitor C, the voltage at the point P rises to a predetermined value, the transistor $T_1$ turns on. This causes the voltage of the collector side of the transistor $T_1$ to drop abruptly. Accordingly, the transistor $T_2$, whose base electrode receives said voltage as a control signal, turns on, so that a current flows through the solenoid of electromagnet M. Thus, the electromagnet M releases the lagging screen of the focal plane shutter arrangement to run so as to close the shutter. Alternatively, the electric circuit may be so constituted that the lagging screen is permitted to run by interruption of current flow through the electromagnet M.

Figure 2:
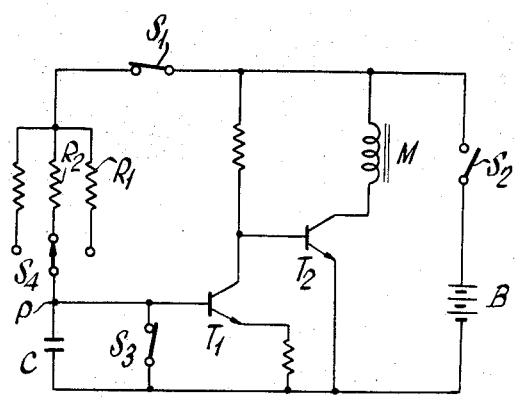
FIG. 2 is a circuit diagram of an example of a focal plane shutter timing and control network of the improved shutter system.

The exposure control by the lens shutter is performed as follows: In the lens shutter arrangement which is provided in an interchangeable objective attached to a camera or is provided in the camera itself, the set lever 2 is operated in the direction of the arrow of FIG. 1 so as to perform the shutter charge operation. This causes the pin 3 to move upwardly, as viewed in FIG. 1, and as a result, the pin 3 pushes up the moveable contact piece of the switch $S_1$ so that the switch $S_1$ is opened. Then, the release button is depressed to open the focal plane shutter. Thus, in the electric circuit as shown in FIG. 2, since the switch $S_1$ is now opened the current does not flow through the RC timing circuit, so that when the switch $S_3$ is opened the timing operation is not started. Therefore, under these conditions the focal plane shutter is kept open.

Consequently, when the lens shutter arrangement is operated by means of its release button, the predetermined shutter opening-closing operation is effected. It is possible to automatically effect the release of the lens shutter following opening of the focal plane shutter either by using two cooperating release cables or by using a mechanism for performing such release operation built into the camera mechanism itself.

When the release of the lens shutter is completed the set lever 2 return swings in a counterclockwise direction thereby returning the pin 3 to the initial position occupied before the shutter charge operation. This action causes the switch $S_1$, to be closed. In the electric circuit with the switch $S_1$ closed, the RC timing circuit starts its timing operation or interval. After an elapse of time determined by a resistor selected by the switch $S_4$ from among the timing resistors $R_1$, $R_2$,..$R_n$, a signal is produced to actuate the electromagnet M through the actions of the switch transistors $T_1$ and $T_2$. Thus the lagging screen of the focal plane shutter is released to run, causing the shutter to be closed.

Thus, according to the present invention, a switch, which controls the start of the operation of the electric timing circuit for determining the shutter time of the focal plane shutter, is under the control of a member such as a shutter charging member of the lens shutter, which is actuated when the operator intends to use the lens shutter and which returns after completion of the operation of the lens shutter to the initial position occupied before the actuation. Accordingly, the focal plane shutter, which as been opened before release of the lens shutter, is kept open with no timing operation started. In the meantime, the operation of the lens shutter is performed. After completion of this operation, the focal plane shutter is automatically closed by the operation of the timing circuit.

Thus, the arrangement according to the present invention provides the following great practical advantage: When the lens shutter is to be used it is not necessary to set the focal plane shutter arrangement to such special time control value as "bulb" or "slow speed" exposure. After completion of the operation of the lens shutter the focal plane shutter is automatically closed.

The subsequent use of the focal plane shutter or interchange of objectives is readily carried out without any special care. This arrangement serves to decrease failures of photographing operation due to mistaken operation.

While there has been described and illustrated a preferred embodiment of the present invention, it is apparent that numerous alterations, omissions and additions may be made without departing from the spirit thereof.

What is claimed is:

1. In a camera including a focal plane shutter and a lens shutter including a shutter charging ring movable between charged and discharged positions, with the charged and discharged conditions respectively of said lens shutter, a rearwardly projecting actuating member movable with said charging ring, a first switch located in the path of movement of and actuated by said actuating member to open and closed positions, with the charged and discharged positions respectively of said shutter charging ring, an RC timing network including a timing capacitor and a resistance section, a third switch connected across said timing capacitor and movable between open and closed conditions respectively with said focal plane shutter, a second switch, said timing network first switch and second switch being connected in series across a source of current, and circuit means responsive to the closing of said first and second switches for opening said focal plane shutter and responsive to a predetermined charge on said capacitor for closing said focal plane shutter.

2. The camera of claim 1 including means for adjusting the resistance of said resistance section.

3. The camera of claim 1 wherein said resistance section comprises a photoconductor.

4. The camera of claim 1 wherein said timing network comprises a solid state switch having an input connected across said capacitor and an output, and said focal plane shutter closing means comprises a solenoid connected to said solid state switch output.

* * * * *